US010348827B2

(12) United States Patent
Liu et al.

(10) Patent No.: US 10,348,827 B2
(45) Date of Patent: Jul. 9, 2019

(54) DISTRIBUTED STORAGE SYSTEM, CLUSTER NODE AND RANGE MANAGEMENT METHOD THEREOF

(71) Applicant: Huawei Technologies Co., Ltd., Shenzhen, Guangdong (CN)

(72) Inventors: Zhe Liu, Hangzhou (CN); Ke Shen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 709 days.

(21) Appl. No.: 14/983,853

(22) Filed: Dec. 30, 2015

(65) Prior Publication Data
US 2016/0112516 A1    Apr. 21, 2016

Related U.S. Application Data

(63) Continuation of application No. PCT/CN2014/080025, filed on Jun. 17, 2014.

(30) Foreign Application Priority Data

Jul. 2, 2013 (CN) .......................... 2013 1 0274957

(51) Int. Cl.
*H04L 29/08* (2006.01)
*H04L 12/741* (2013.01)
(Continued)

(52) U.S. Cl.
CPC .......... *H04L 67/1097* (2013.01); *H04L 45/02* (2013.01); *H04L 45/54* (2013.01);
(Continued)

(58) Field of Classification Search
USPC ....................................................... 709/223
See application file for complete search history.

(56) References Cited

U.S. PATENT DOCUMENTS

2006/0195648 A1* 8/2006 Chandrasekaran .......................... G06F 11/1471 711/100
2006/0251124 A1* 11/2006 Colmant ............... H04L 49/153 370/503
(Continued)

FOREIGN PATENT DOCUMENTS

CN    101483670 A    7/2009
CN    102325093 A    1/2012
(Continued)

OTHER PUBLICATIONS

Jun Rao, et al., "Using Paxos to Build a Scalable, Consistent, and Highly Available Datastore", Proceedings of the VLDB Endowment, vol. 4, No. 4, 2011, p. 243-254.
(Continued)

*Primary Examiner* — Hermon Asres

(57) ABSTRACT

Disclosed are a distributed storage system, a cluster node, and a range management method thereof, including: partitioning, by the cluster node according to a configuration parameter, a range corresponding to a first routing table entry in a local routing table into at least two subranges, where the first routing table entry refers to a routing table entry in which information that indicates the cluster node is recorded in replica information; separately establishing, by the cluster node, a log queue for each of the subranges; determining, by the cluster node, a corresponding subrange according to a key field of a data operation request from a client; executing a corresponding data read/write operation according to the determined subrange; and updating, according to the data read/write operation, a log queue corresponding to the determined subrange.

16 Claims, 14 Drawing Sheets

US 10,348,827 B2

Page 2

(51) Int. Cl.
*H04L 12/743* (2013.01)
*H04L 12/751* (2013.01)
*H04L 12/803* (2013.01)

(52) U.S. Cl.
CPC ........ *H04L 45/7453* (2013.01); *H04L 47/125* (2013.01); *H04L 67/1095* (2013.01); *H04L 67/32* (2013.01)

(56) References Cited

U.S. PATENT DOCUMENTS

| | | | |
|---|---|---|---|
| 2011/0178985 A1* | 7/2011 | San Martin Arribas | G06F 17/30581 707/636 |
| 2011/0196836 A1 | 8/2011 | Kesselman | |
| 2012/0330954 A1* | 12/2012 | Sivasubramanian | G06F 9/5061 707/737 |

FOREIGN PATENT DOCUMENTS

| CN | 102739526 A | 10/2012 |
|---|---|---|
| IL | 185417 B | 6/2012 |

OTHER PUBLICATIONS

Robert Escriva, et al., "HyperDex: A Distributed, Searchable Key-Value Store", SIGCOMM '12, Aug. 13-17, 2012, p. 25-36.

\* cited by examiner

US 10,348,827 B2

DISTRIBUTED STORAGE SYSTEM, CLUSTER NODE AND RANGE MANAGEMENT METHOD THEREOF

CROSS-REFERENCE TO RELATED APPLICATIONS

This application is a continuation of International Application No. PCT/CN2014/080025, filed on Jun. 17, 2014, which claims priority to Chinese Patent Application No. 201310274957.0, filed on Jul. 2, 2013, both of which are hereby incorporated by reference in their entireties.

TECHNICAL FIELD

The present invention relates to a distributed storage system, and in particular, to a cluster node in the distributed storage system and a range management method thereof.

BACKGROUND

A networking topology of a distributed storage system may be as shown in FIG. 1, and mainly includes a client, a manager node, and several cluster nodes. Generally, a node is a physical machine. A cluster node is a collective name of a master node and a slave node, where each master node is corresponding to one or more slave nodes, and nodes communicate with each other by using a network.

For the distributed storage system shown in FIG. 1, in order to improve a throughput of data processing and overall performance, fragmentation storage and fragment querying are generally performed on data. A commonly used fragmentation is performing a range partition; that is, a large data storage range is divided into several small ranges, and each node is in charge of a continuous range. The so-called "a node is in charge of a range" refers to that a data read/write operation for the range is managed, controlled, and/or executed by the node. When a read/write operation is being performed, a client traverses table entries of a routing table according to a key field of a data operation; finds, according to ranges in the table entries, a node (master node) that is in charge of the range; and performs the read/write operation on the node. Hereinafter, a range that is in the charge of a master node is referred to as a routing range, so as to indicate that the client can find, by using the routing table, the master node in charge of the range and execute a corresponding data operation.

In another aspect, in consideration of reliability, in the distributed storage system, each node generally has at least one data replica, and backup data is usually distributed on different nodes (slave nodes). When data synchronization is being performed between a master node and a slave node, the master node sends a synchronization request that includes information such as a data operation record to the slave node, and the slave node responds to the synchronization request, traverses table entries of a routing table according to a key field of the data operation record, and performs a corresponding backup data synchronization operation for a range in a table entry. Hereinafter, a range in which a master node and a slave node perform a data operation is referred to as a sync range, so as to indicate that the slave node can find the range by using the routing table and execute a corresponding backup data synchronization operation.

In the prior art, a routing range and a sync range have a same size. For example, it is assumed that a node A is used as a master node and is in charge of a range [0, 100], and a node B is used as a slave node of the node A in the range [0, 100]. Therefore, for a client, the range [0, 100] is a routing range that is used to find the node A; for the node A and the node B, the range [0, 100] is a sync range in which the node A and the node B perform a data operation.

As a result, in a case in which a quantity of cluster nodes is fixed, if a quantity of ranges maintained by a node is relatively small, for example, a database Spinnake that performs a range partition according to a primary key, a case in which multiple threads compete for permission for performing a data operation on a same range may occur, and especially for a hot range, a phenomenon of serial execution may be easily caused, which inevitably causes an extension of access time and reduction in data read/write efficiency and backup efficiency, thereby affecting a data processing throughput of a system.

In another aspect, in a case in which a quantity of cluster nodes is fixed, if a quantity of ranges maintained by a node is relatively large, for example, a distributed key value database HyperDex that performs a range partition according to both a primary key and a non-primary key, routing overhead of a client increases due to a relatively large quantity of routing ranges.

SUMMARY

In view of this, a technical problem to be resolved in embodiments of the present invention is how to perform range management on a cluster node in a distributed storage system, so as to effectively improve a data processing throughput of the system without increasing routing overhead of a client.

To resolve the foregoing technical problem, a range management method is provided according to a first aspect of the embodiments of the present invention, where the method is applied to a cluster node in a distributed storage system that includes the cluster node and a client. The method mainly includes: partitioning, by the cluster node according to a configuration parameter, a range corresponding to a first routing table entry in a local routing table into at least two subranges, where the local routing table includes at least one routing table entry, each routing table entry includes at least range information and replica information, the range information indicates information about a range corresponding to the routing table entry, the replica information is used to record information about a cluster node set corresponding to the range, and the first routing table entry refers to a routing table entry that is in the replica information and records information indicating the cluster node; separately establishing, by the cluster node, a log queue for each of the subranges; determining, by the cluster node, a corresponding subrange according to a key field of a data operation request when the data operation request is received from the client; and executing, by the cluster node according to the determined subrange, a data read/write operation corresponding to the data operation request, and updating, according to the data read/write operation, a log queue corresponding to the determined subrange.

With reference to the first aspect, in a first possible implementation manner, in a case in which the cluster node updates the local routing table, the method further includes: partitioning, by the cluster node according to the configuration parameter, a range corresponding to a first routing table entry in an updated local routing table; and for each subrange obtained by the partitioning after the updating, determining, by the cluster node, whether a log queue corresponding to the subrange exists on the cluster node; and if the log queue corresponding to the subrange exists on the cluster node, updating, by the cluster node according to replica information in the first routing table entry, synchronization node information corresponding to the subrange, where the synchronization node information indicates information about another cluster node that keeps data synchronized with that of the cluster node in the subrange; if the log queue corresponding to the subrange does not exist on the cluster node, establishing, by the cluster node, a log queue for the subrange.

With reference to the first possible implementation manner of the first aspect, in a second possible implementation manner, the method further includes: for each subrange of which a corresponding log queue exists on the cluster node, determining, by the cluster node, whether the subrange belongs to a result set and whether the log queue corresponding to the subrange is empty; and in a case in which the subrange does not belong to the result set and the log queue corresponding to the subrange is empty, deleting the subrange and the log queue corresponding to the subrange from the cluster node, where the result set refers to a set of subranges obtained by partitioning, according to the configuration parameter, a range corresponding to a first routing table entry in a current local routing table of the cluster node.

With reference to the first aspect, the first possible implementation manner of the first aspect, or the second possible implementation manner of the first aspect, in a third possible implementation manner, after the partitioning, by the cluster node according to a configuration parameter, a range corresponding to a first routing table entry in a local routing table into at least two subranges, the method further includes: sending, by the cluster node, a partition request to another cluster node recorded in the replica information of the first routing table entry, where the partition request includes the configuration parameter and information that indicates the range, so that the another cluster node also partitions the range according to the configuration parameter.

With reference to the first aspect, the first possible implementation manner of the first aspect, the second possible implementation manner of the first aspect, or the third possible implementation manner of the first aspect, in a fourth possible implementation manner, the determining, by the cluster node, a corresponding subrange according to a key field of a data operation request includes: performing, by the cluster node, hashing on the key field of the data operation request according to a hash algorithm; searching for, by the cluster node, a corresponding subrange according to a result of the hashing; and in a case in which the corresponding subrange is not found, returning, by the cluster code to the client, a response that indicates a routing error.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner, after the separately establishing, by the cluster node, a log queue for each of the subranges, the method further includes: separately configuring, by the cluster node, read/write operation permission for each of the subranges.

With reference to the fifth possible implementation manner of the first aspect, in a sixth possible implementation manner, the executing, by the cluster node according to the determined subrange, a data read/write operation corresponding to the data operation request, and updating, according to the data read/write operation, a log queue corresponding to the determined subrange includes: obtaining, by the cluster node, read/write operation permission on the determined subrange; writing, by the cluster node by using a new serial number, operation data of the data operation request into the log queue corresponding to the determined subrange; and writing, by the cluster node, the operation data into a memory, and feeding back a processing result to the client.

With reference to the sixth possible implementation manner of the first aspect, in a seventh possible implementation manner, before the writing, by the cluster node, the operation data into a memory, the method further includes: sending, by the cluster node, a synchronization request to the another cluster node recorded in the replica information of the first routing table entry, where the another cluster node refers to a node that is in the distributed storage system and is configured to back up data of the cluster node in the range, and the synchronization request includes the operation data and information about the subrange, so that the another cluster node keeps, according to the subrange, data synchronized with that of the cluster node.

With reference to the first aspect and any one of all the foregoing possible implementation manners of the first aspect, in an eighth possible implementation manner, the configuration parameter is a quantity of segments, and the quantity of segments indicates a quantity of subranges to be partitioned from a range corresponding to the first routing table entry.

With reference to the seventh possible implementation manner of the first aspect, in a ninth possible implementation manner, both the quantity of segments and the information that indicates the range are recorded in a routing table entry that is corresponding to the range and is in the local routing table.

According to a second aspect, an embodiment of the present invention further provides a cluster node, where the cluster node is applied to a distributed storage system that includes the cluster node and a client, and mainly includes: a network module that is connected to the client, configured to receive a data operation request from the client; a routing table management module that is connected to the network module, configured to: manage a local routing table of the cluster node, process the data operation request, and partition, according to a configuration parameter, a range corresponding to a first routing table entry in the local routing table into at least two subranges, where the local routing table includes at least one routing table entry, each routing table entry includes at least range information and replica information, the range information indicates information about a range corresponding to the routing table entry, the replica information is used to record information about a cluster node set corresponding to the range, and the first routing table entry refers to a routing table entry that is in the replica information and records information indicating the cluster node; a data synchronization management module that is connected to the network module and the routing table management module, configured to separately establish a log queue for each of the subranges; and a storage module that is connected to the data synchronization management module, configured to perform data storage and persistence, where when the network module receives the data operation request, the routing table management module determines a corresponding subrange according to a key field of the data operation request; the data synchronization management module executes, according to the determined subrange, a data read/write operation corresponding to the data operation request, and updates, according to the data read/write operation, a log queue corresponding to the determined subrange.

With reference to the second aspect, in a first possible implementation manner, the network module is further configured to receive a routing table of a latest version of the distributed storage system; the routing table management module is further configured to: update the local routing table into the routing table of the latest version; and partition, according to the configuration parameter, a range corresponding to a first routing table entry in an updated local routing table; and the data synchronization management module is further configured to: for each subrange obtained by the partitioning after the updating, determine whether a log queue corresponding to the subrange exists on the cluster node; and if a determining result is that the log queue corresponding to the subrange exists, the data synchronization management module updates, according to replica information in the first routing table entry, synchronization node information corresponding to the subrange, where the synchronization node information indicates information about another cluster node that keeps data synchronized with that of the cluster node in the subrange; if a determining result is that the log queue corresponding to the subrange does not exist, the data synchronization management module establishes a log queue for the subrange.

With reference to the first possible implementation manner of the second aspect, in a second possible implementation manner, the data synchronization management module is further configured to: for each subrange of which a corresponding log queue exists on the cluster node, determine whether the subrange belongs to a result set and whether the log queue corresponding to the subrange is empty; and in a case in which the subrange does not belong to the result set and the log queue corresponding to the subrange is empty, delete the subrange and the log queue corresponding to the subrange from the cluster node, where the result set refers to a set of subranges obtained by partitioning, according to the configuration parameter, a range corresponding to a first routing table entry in a current local routing table of the cluster node.

With reference to the second aspect, the first possible implementation manner of the second aspect, or the second possible implementation manner of the second aspect, in a third possible implementation manner, the routing table management module is further configured to generate a partition request after the range corresponding to the first routing table entry in the local routing table is partitioned into at least two subranges, where the partition request includes the configuration parameter and information that indicates the range; and the network module is further configured to send the partition request to another cluster node recorded in the replica information of the first routing table entry, so that the another cluster node also partitions the range according to the configuration parameter.

With reference to the second aspect, the first possible implementation manner of the second aspect, the second possible implementation manner of the second aspect, or the third possible implementation manner of the second aspect, in a fourth possible implementation manner, the data synchronization management module is further configured to separately configure read/write operation permission for each of the subranges.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner, the configuration parameter is a quantity of segments, and the quantity of segments indicates a quantity of subranges to be partitioned from a range corresponding to the first routing table entry.

With reference to the fifth possible implementation manner of the second aspect, in a sixth possible implementation manner, both the quantity of segments and the information that indicates the range are recorded in a routing table entry that is corresponding to the range and is in the local routing table.

According to a third aspect, an embodiment of the present invention provides a distributed storage system that includes a client and at least two cluster nodes described in any embodiment of the present invention, where each of the cluster nodes is connected to the client, and each of the cluster nodes is configured to respond to a data operation request from the client, so as to perform a data processing operation and return a processing result of the data processing operation to the client.

It can be seen that, according to the range management method and the apparatus that are provided in the embodiments of the present invention, a continuous range is partitioned into at least two subranges on a cluster node, and a log (log) queue is established and maintained for each of the subranges, and according to the distributed storage system, the cluster node, and the range management method thereof in the embodiments of the present invention, original serial operations for the whole continuous range on the cluster node may be changed into parallel operations that are respectively for the at least two subranges obtained by partitioning, thereby effectively improving a throughput for the whole distributed storage system, especially in a case of concurrent write by multiple threads.

BRIEF DESCRIPTION OF THE DRAWINGS

To describe the technical solutions in the embodiments of the present invention more clearly, the following briefly introduces the accompanying drawings required for describing the embodiments of the present invention.

DETAILED DESCRIPTION

The following clearly describes the technical solutions in the embodiments of the present invention with reference to the accompanying drawings in the embodiments of the present invention.

The special term "exemplary" herein refers to "can be used as an example, an embodiment, or an illustration". Any embodiment described as "exemplary" herein is not necessarily to be interpreted as optimal or better than other embodiments.

In addition, to better describe the present invention, many details are given in the following specific implementation manners. A person skilled in the art shall understand that the present invention may still be implemented even without such details. In other instances, well-known methods, means, elements, and circuits are not specifically described, so as to highlight the subject of the present invention.

As described in the background part, for a distributed storage system, an urgent problem to be resolved at present is how to perform range management on a node, so as to improve a data processing throughput of the system as far as possible without increasing routing overhead of a client.

Figure 1:
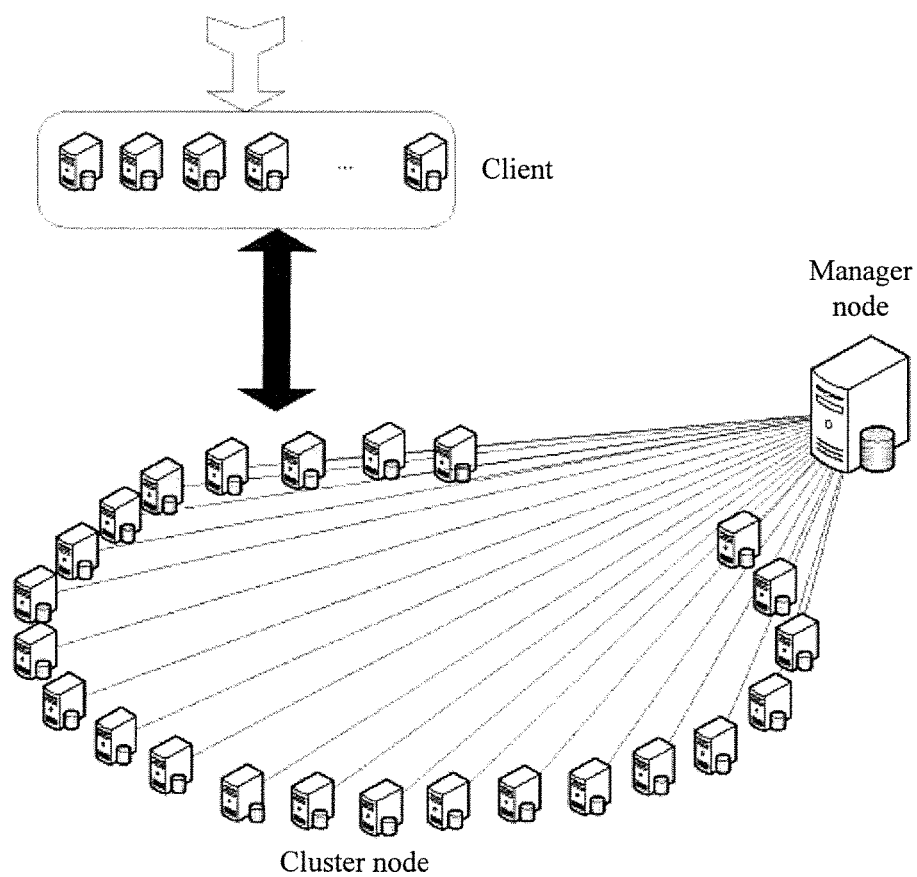
FIG. 1 shows a schematic diagram of a networking topology of a distributed storage system.
Figure 2:
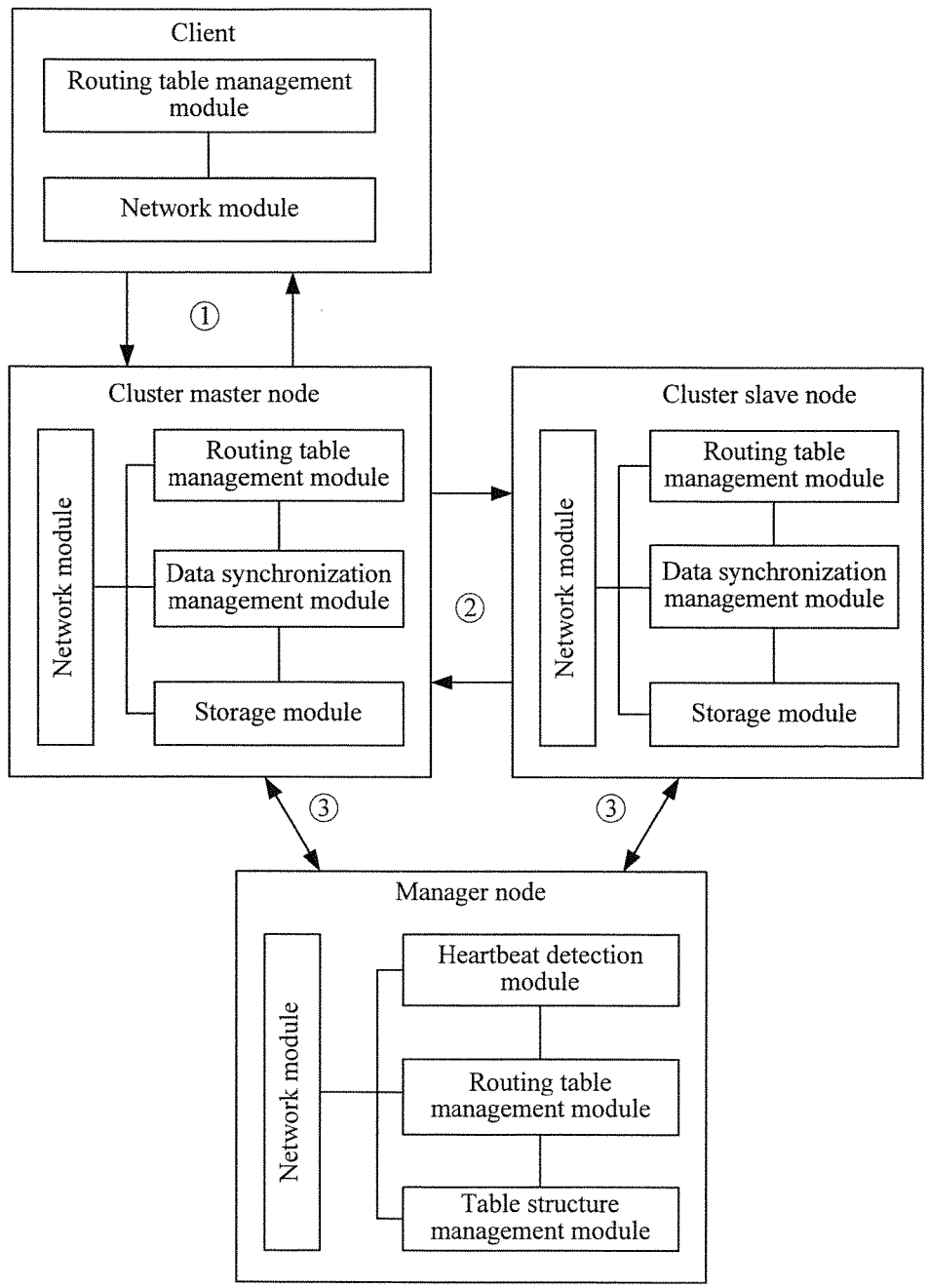
FIG. 2 shows a schematic diagram of modular composition of and mutual interaction between a client, a cluster node that is used as a master node (hereinafter referred to as a cluster master node or a master node), a cluster node that is used as a slave node (hereinafter referred to as a cluster slave node or a slave node), and a manager node in a distributed storage system.

FIG. 2 shows a schematic diagram of modular composition of and mutual interaction between a client, a master node, a slave node, and a manager node in a distributed storage system shown in FIG. 1. As shown in FIG. 2, communication in the distributed storage system mainly includes:

(1) Interaction between the client and a cluster node

Figure 3:
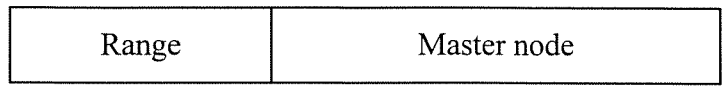
FIG. 3 shows a schematic diagram of a data structure of a table entry of a routing table on a client in a distributed storage system.

As shown in FIG. 2, the client mainly includes a routing table management module and a network module, where the routing table management module mainly performs initialization and updating operations on a routing table, and the network module is configured to connect a cluster master node. Initialization of the routing table on the client is obtained from a cluster node that is firstly connected. A table entry included in the routing table on the client is mainly formed by a range and a master node, and a specific composition structure may be that shown in FIG. 3.

Figure 4:
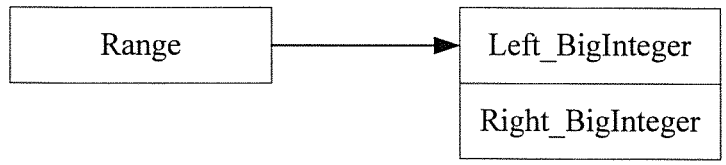
FIG. 4 shows a schematic diagram of a data structure of a range in a table entry of a routing table on a client in a distributed storage system.

In a possible implementation manner, a range is a set of BigIntegers. In this way, a range included in a table entry of the routing table is mainly formed by a left BigInteger and a right BigInteger, and a specific structure may be that shown in FIG. 4.

Figure 5:
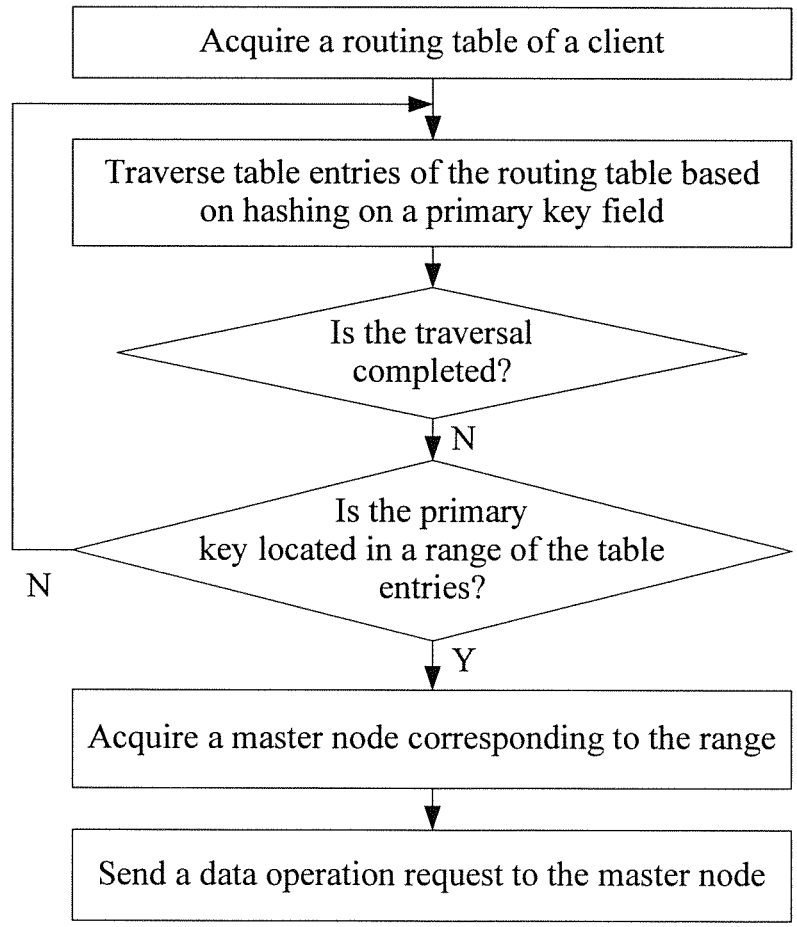
FIG. 5 shows a schematic flowchart of processing executed by a client in a distributed storage system to respond to a data operation requirement.

Responding to a data operation requirement, the client traverses table entries of a local routing table according to a primary key field (for example, according to a result of hashing performed on the primary key field by using an MD algorithm), finds a corresponding master node according to range values in the table entries, and sends a data operation request to the master node, so that the master node executes a corresponding data read or write operation. A specific processing flow may be that shown in FIG. 5.

After a cluster node receives a data operation request from the client, and once a routing error is found, that is, the cluster node is not a master node, a failure is returned to the client. Responding to a received routing failure returned by the cluster node, the client sends a routing table updating request to a connected cluster node, so that the connected cluster node returns a local routing table to the client. The client updates the local routing table according to the routing table received from the connected cluster node, and a specific processing flow may be that shown in FIG. 6. It should be noted that, a routing table is not forwarded between cluster nodes.

(2) Interaction between cluster nodes

As shown in FIG. 2, a cluster node includes a routing table management module, a data synchronization management module, a storage module, and a network module.

Figure 7:
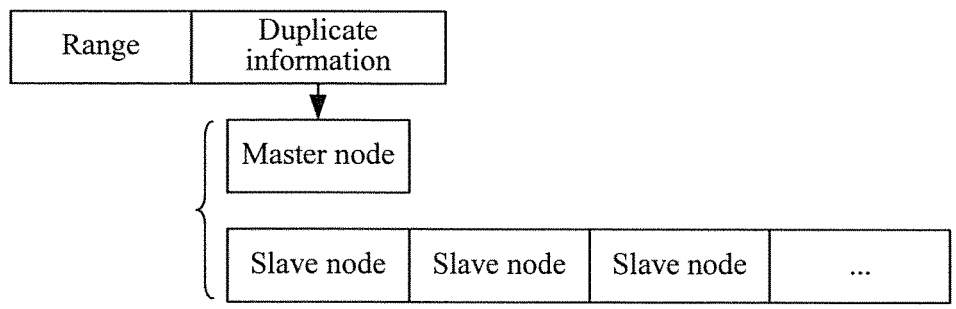
FIG. 7 shows a schematic diagram of a data structure of a table entry of a routing table on a cluster node in a distributed storage system.

The routing table management module of the cluster node mainly manages a local routing table of the cluster node and processes a data operation request of the client. All cluster nodes and the manager node share a routing table. Table entries of the routing table include not only routing information of the cluster node, but also routing information of all the other cluster nodes. For example, it is assumed that there are two cluster nodes A and B in total; if the node A is in charge of a range [0, 10] and the node B is in charge of a range [20, 30], a quantity of table entries of the routing table is two, and routing tables on the node A and the node B are the same and both include the two table entries, so that each of the routing tables has both information about a range that is in the charge of the cluster node and information about another node that is irrelevant to the cluster node. In addition, a table entry of the routing table includes range information and replica information, and a specific composition structure may be that shown in FIG. 7. The replica information mainly records a cluster node set corresponding to the range, where the cluster node set may include a master node and a slave node, so as to indicate that whether a cluster node is used as a master node or used as a slave node to take charge of the range.

Figure 8:
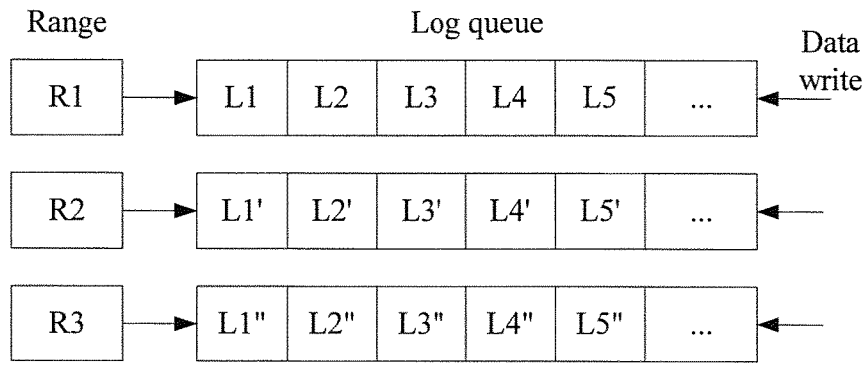
FIG. 8 shows a schematic diagram of a correspondence between a range and a log queue that are on a cluster node in a distributed storage system.
Figure 9:
FIG. 9 shows a schematic diagram of a data structure that is synchronized from a cluster master node to a cluster slave node in a distributed storage system.

The data synchronization management module of the cluster node is configured to manage a range, so as to implement data synchronization between a master node and a the slave node. In a possible implementation manner, a log queue is used for implementing the data synchronization between a master node and a slave node. Specifically, one range is corresponding to one log queue, and a log queue corresponding to a range on the master node keeps consistent with a log queue corresponding to the range on the slave node. A specific correspondence between a range and a log queue may be that shown in FIG. 8. R1 to R3 are values of ranges, and L1 to LN, L1' to LN', and L1" to LN" are records in corresponding log queues respectively. L1, L1' and L1" are headers of the log queues respectively, and when there is a new record, the new record is written at a tail of a corresponding log queue. In order to ensure data consistency between the master node and the slave node, the master node sends the new record together with a value of a corresponding range to the slave node when performing synchronization to the slave node. A data structure that the master node sends to the slave node may be that shown in FIG. 9.

Figure 10:
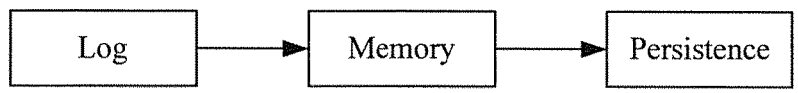
FIG. 10 shows a schematic diagram of a flow direction of data in a storage module on a cluster node in a distributed storage system.

The storage module of the cluster node is configured to perform data storage and persistence, and may include a log (commitlog) submodule, a memory (memtree) submodule, and a persistence (sstree) submodule. A flow direction of data between the three submodules may be that shown in FIG. 10.

Figure 11:
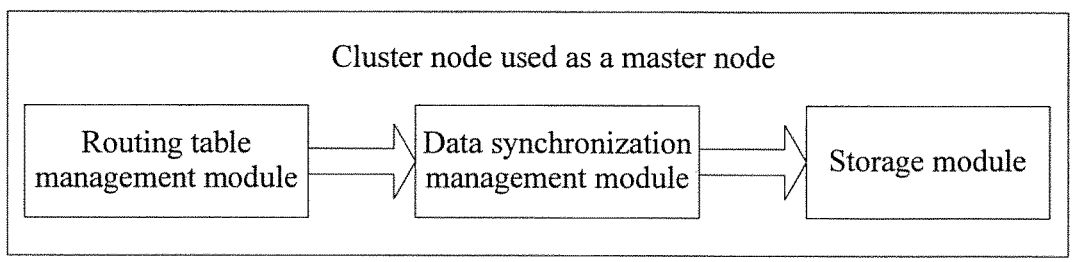
FIG. 11 shows a schematic diagram of a data flow direction on a cluster node that is used as a master node in a distributed storage system.

After receiving a data operation request from the client, the master node invokes a routing table management module on the master node, and transmits the data operation request to the data synchronization management module, so as to perform the data synchronization between the master node and the slave node. Then, after receiving a response returned by the slave node, the master node invokes a storage module on the master node to perform data storage. A data flow direction on the cluster node may be that shown in FIG. 11.

Figure 12:
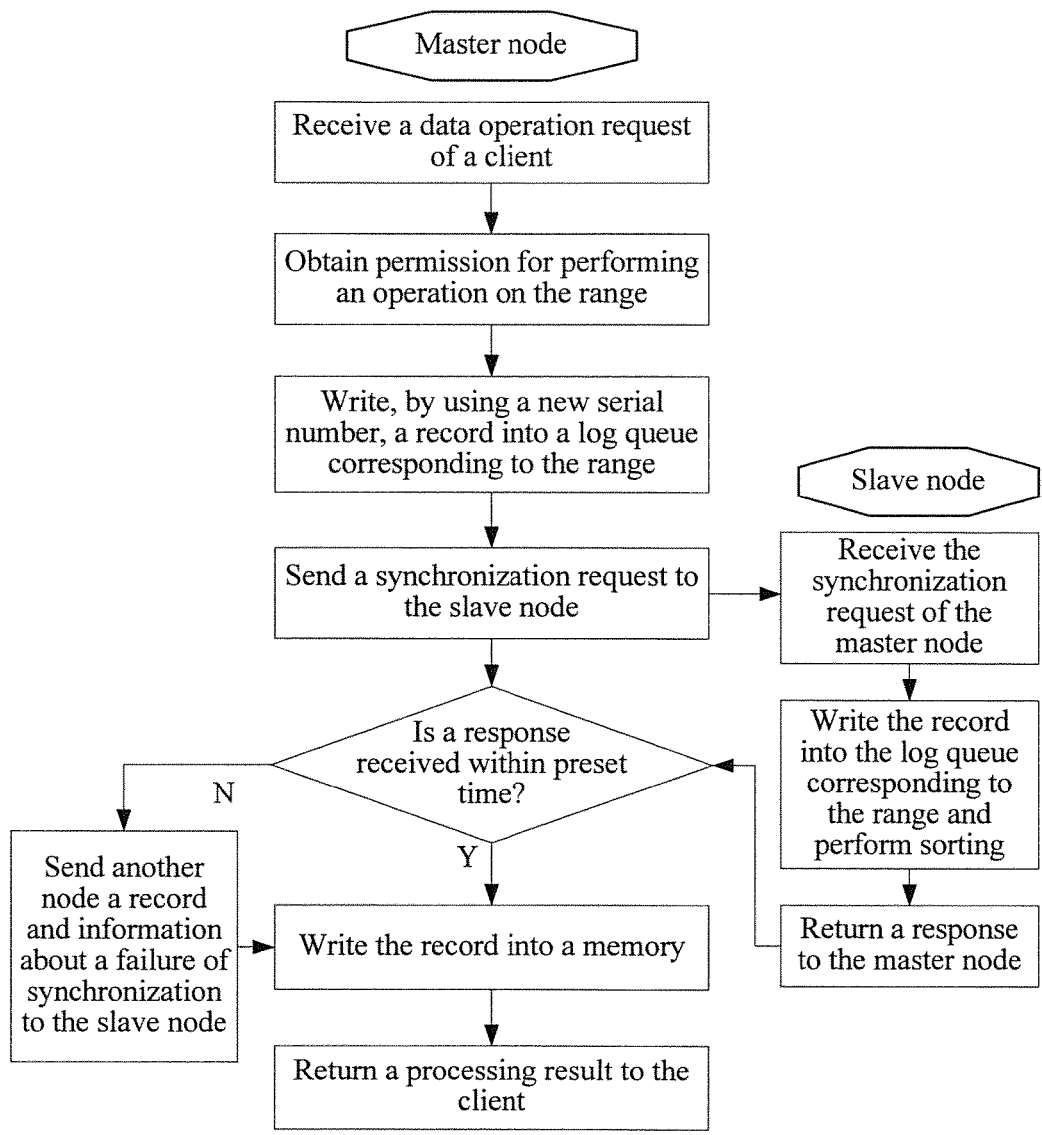
FIG. 12 shows a schematic flowchart of processing of a first phase of data synchronization that is between a master node and a slave node and is performed in an asynchronous submission manner by a cluster node in a distributed storage system.

In a possible implementation manner, data synchronization between master and slave cluster nodes is performed in an asynchronous submission manner; that is, after the master node writes a record into a memory and the slave node writes the record into a corresponding log queue, a result that data writing is successful is returned to the client, and then, the master node periodically sends a submission request to the slave node, so that the slave node writes the record into a memory. In other words, data synchronization that is between a master node and a slave node and is performed in the asynchronous submission manner may be divided into two phases, and a flowchart of a first phase may be that shown in FIG. 12. Responding to a data operation request from the client, the master node performs local processing on a record, and then sends a synchronization request to the slave node, where the synchronization request may include information such as the record and a corresponding range. Responding to the synchronization request received from the master node, the slave node performs local processing on the synchronization request, and then returns a response to the master node. Finally, the master node returns a processing result (success or failure) to the client. As shown in FIG. 12, the local processing of the master node includes: writing, by using a new serial number, the record into a log queue corresponding to the range; and writing the record into a memory when the slave node returns or does not return, due to timeout, the response that is for the synchronization request. The local processing of the slave node includes: writing the record into the log queue corresponding to the range, and sorting the log queue according to the serial number.

Figure 13:
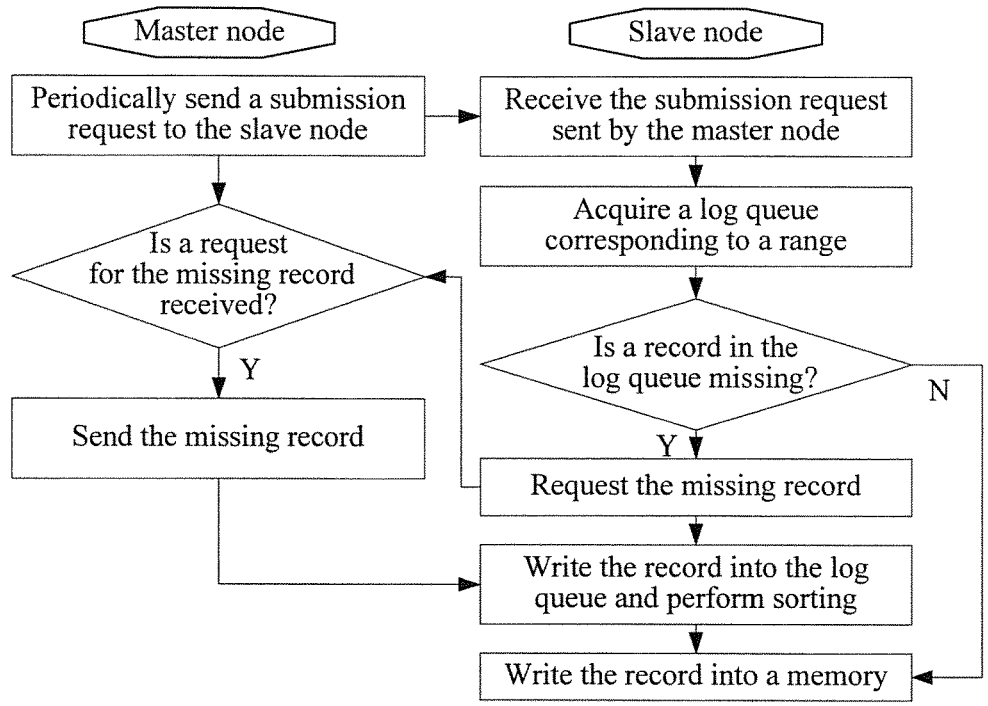
FIG. 13 shows a schematic flowchart of processing of a second phase of data synchronization that is between a master node and a slave node and is performed in an asynchronous submission manner by a cluster node in a distributed storage system.

A specific processing flow of a second phase of the data synchronization that is between the master and slave cluster nodes and is performed in the asynchronous submission manner may be that shown in FIG. 13. The master node periodically sends a submission request to the slave node, where the submission request may include information such as a range and a serial number. Responding to the submission request received from the master node, the slave node determines whether a record in a log queue corresponding to the range is missing, and if a record in the log queue corresponding to the range is missing, requests the missing record from the master node; if a record in the log queue corresponding to the range is not missing, writes a record that is in the log queue and is corresponding to the serial number into a memory.

(3) Interaction between a cluster node and the manager node

As shown in FIG. 2, the manager node mainly includes a heartbeat detection module, a routing table management module, a table structure (schema) management module, and a network module.

The heartbeat detection module of the manager node periodically checks and maintains a status of a cluster node according to a heartbeat sent by the cluster node, so as to push a routing table and a table structure that are of latest versions to the cluster node. Main content of the heartbeat sent by the cluster node includes version numbers of a local routing table and the table structure. A specific processing flow of maintaining the routing table and the table structure by the manager node may be that shown in FIG. 14.

The routing table management module of the manager node is mainly configured to: (a) maintain a routing table and a version number of the routing table; each time when the routing table is updated, the version number increases by one; the manager node and all the cluster nodes share a routing table (a data structure of a table entry of the routing table may be that shown in FIG. 7), and the version number of the routing table on the manager node is always greater than or equal to a version number of a routing table on the cluster node; (b) perform partitioning and allocation on a range, which mainly occurs when a new node is added and when load balancing is performed.

Figure 15:
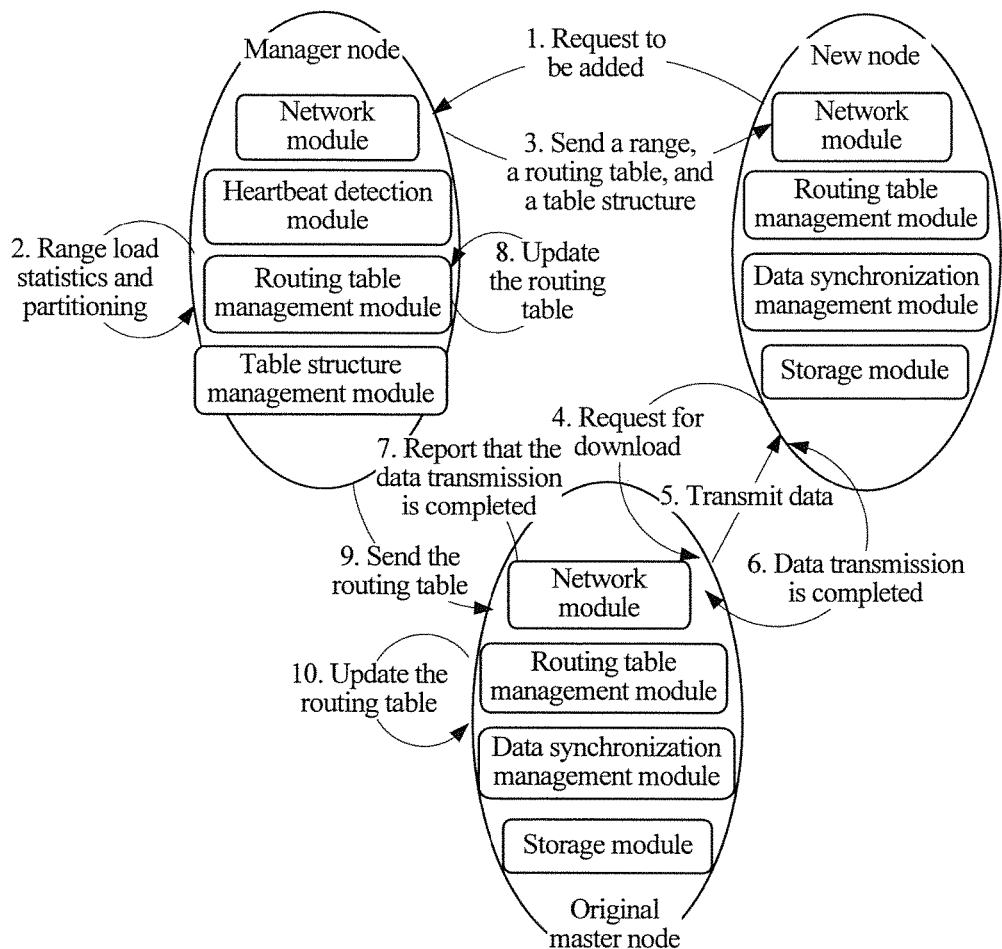
FIG. 15 shows a schematic diagram of a processing flow of a distributed storage system when a new node is added into a cluster.

In a possible implementation manner, when a new cluster node is added, an adding request is directly sent to the manager node. The manager node traverses table entries of the routing table and performs load statistics on ranges, and then, partitions an existing range according to a specific policy, and allocates a range obtained by the partitioning to the new node. The new node requests data that belongs to the range from an original master node corresponding to the range, and the original master node and the new node successively update the routing table after data transmission is completed. In this way, the new node is added into a cluster as a master node that is in charge of the range, and a specific processing flow may be that shown in FIG. 15.

Figure 16:
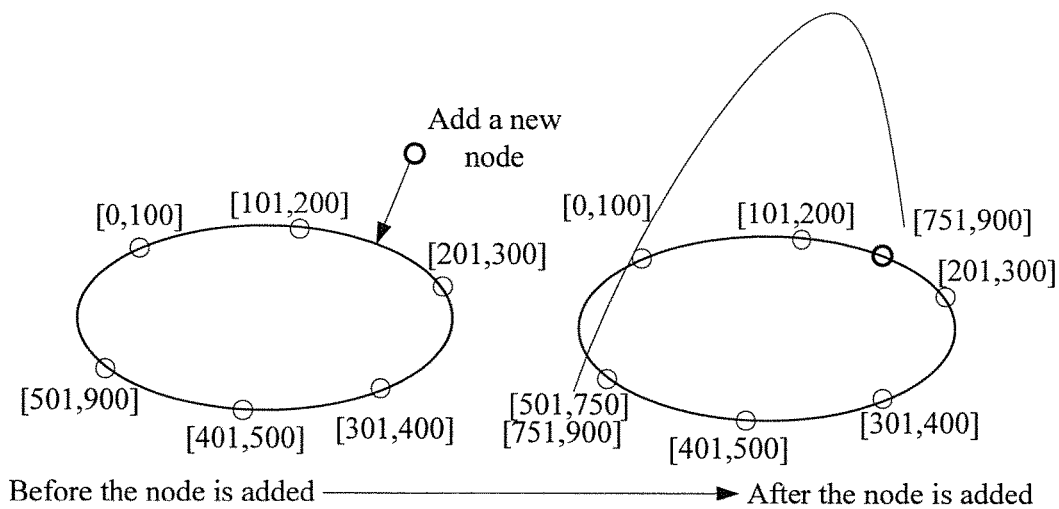
FIG. 16 shows an exemplary diagram of range allocation in a distributed storage system before and after a new node is added.

For example, it is assumed that there are six nodes, and ranges that are respectively in the charge of the six nodes that are used as master nodes are [0, 100], [101, 200], [201, 300], [301, 400], [401, 500], and [501, 900]; then, range division before and after a new node is added may be that shown in FIG. 16. A range [751, 900] that is in the charge of the new node that is used as a master node is obtained by partitioning the original range [501, 900].

Figure 17:
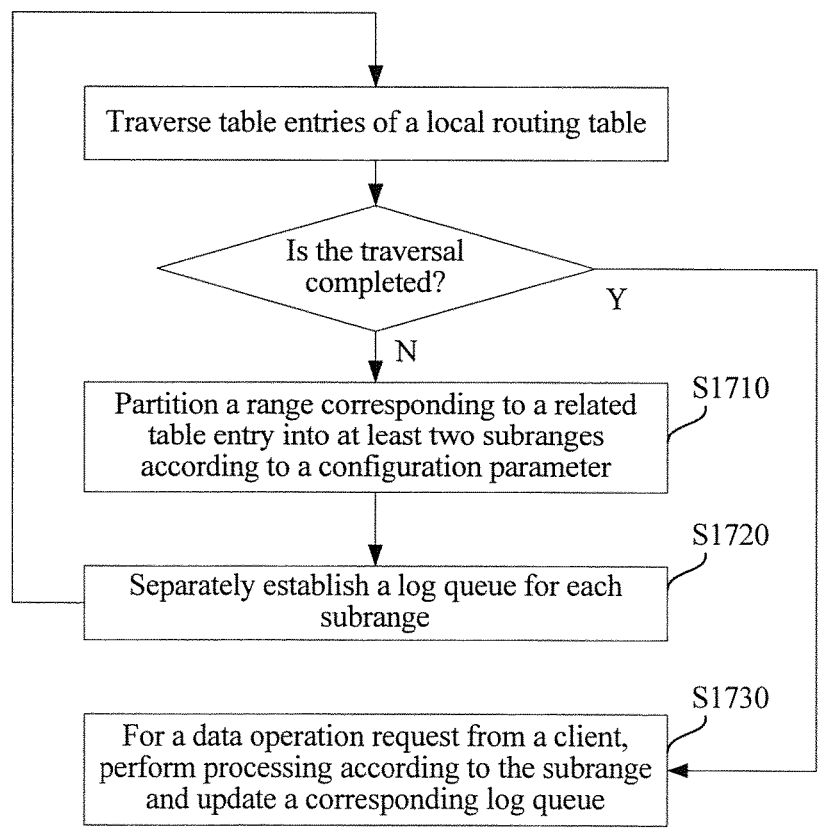
FIG. 17 shows a schematic diagram of a processing flow of a range management method according to an embodiment of the present invention.
Figure 18:
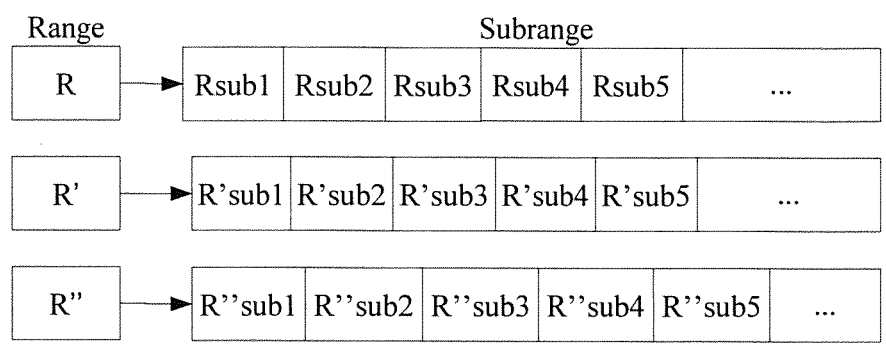
FIG. 18 shows a schematic diagram of a correspondence between a range and at least two subranges obtained by partitioning in the range management method shown in FIG. 17.

In order to improve a local writing speed and a concurrent processing capability of a cluster node without increasing routing overhead of the client, it may be considered to partition a continuous range into a smaller granularity on the cluster node. For example, in a possible implementation manner, as shown in FIG. 17, a cluster node partitions (may be specifically performed by a routing table management module) a range corresponding to a related table entry in a local routing table into at least two subranges according to a specific configuration parameter (S1710), and separately establishes (may be specifically performed by a data synchronization management module) a log queue for each subrange (S1720). The related table entry refers to a routing table entry corresponding to a range that is in the charge of the cluster node that is used as a master node or a slave node. In other words, the related table entry refers to a routing table entry that is in replica information and records information indicating the cluster node. In addition, a correspondence between the range and subranges obtained by the partitioning may be that shown in FIG. 18.

In this way, the client can still send a data operation request to the cluster node according to the range, and specifically, the client still traverses table entries of the local routing table according to a key field of the data operation request, finds a corresponding cluster node according to range values in the table entries, and sends the data operation request to the cluster node.

Figure 6:
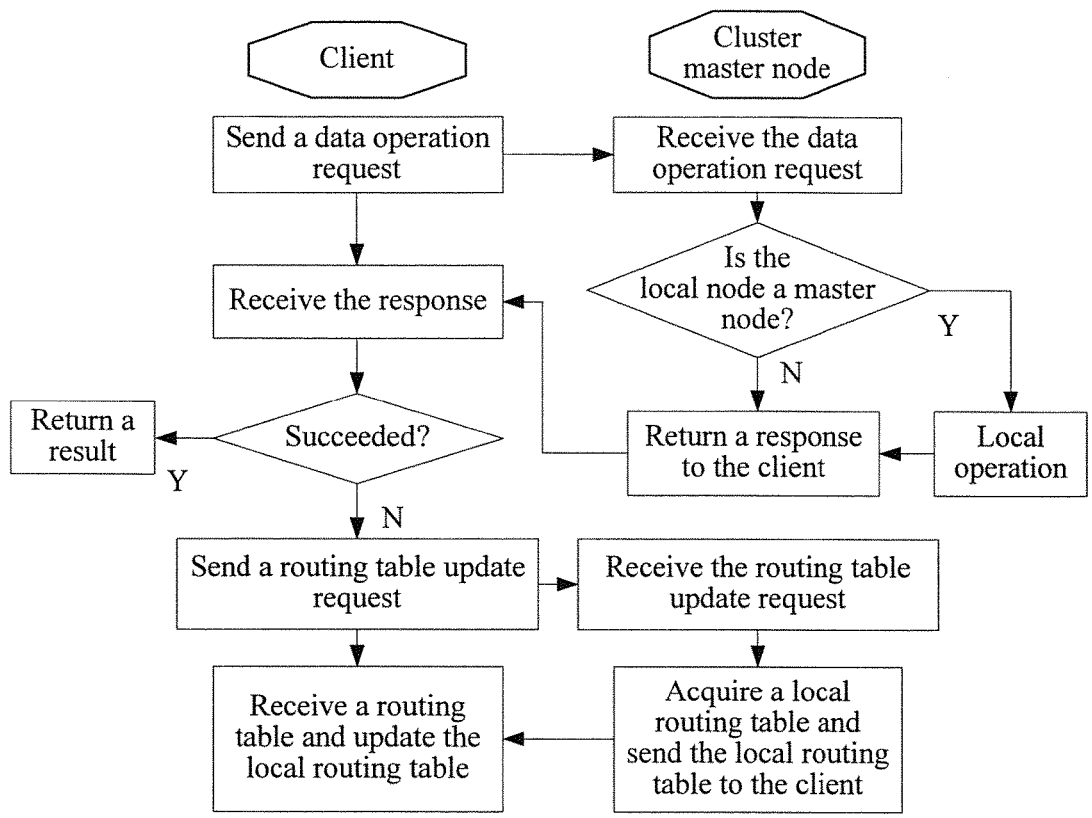
FIG. 6 shows a schematic flowchart of processing executed by a cluster node in a distributed storage system to respond to a data operation request from a client.

However, the cluster node performs (may be specifically performed by the data synchronization management module) local processing according to the subranges obtained by the partitioning (S1730). Specifically, after the cluster node receives (may be specifically performed by a network module) the data operation request from the client, the cluster node first determines (may be specifically performed by the routing table management module) whether the cluster node is a master node that is in charge of a range corresponding to a key field of the data operation request, as shown in FIG. 6. In a case of a routing error, that is, the cluster node finds that the cluster node is not the master node, the cluster node returns (may be specifically performed by the network module) a failure to the client, and a specific processing flow may be that shown in FIG. 6. However, in a case in which routing is correct, the cluster node finds (may be specifically performed by the routing table management module) a corresponding subrange according to the key field of the data operation request, and then, performs (may be specifically performed by the data synchronization management module) a corresponding data read/write operation on the subrange and updates a log queue corresponding to the range, and a specific processing flow may be that shown in FIG. 12.

In a possible implementation manner, a lock may be configured for each subrange separately, that is, permission setting of a read/write operation is performed on the subrange. For example, during insertion of multiple threads, in order to ensure security of the threads, the cluster node configures (may be specifically performed by the data synchronization management module) a read/write lock for each subrange, so that although a log queue of a same subrange is executed serially, log queues of different subranges are executed in parallel. In this way, on the cluster node, original serial operations for the whole continuous range are changed into parallel operations that are respectively for the at least two subranges obtained by the partitioning, so that a throughput of the whole distributed storage system can be remarkably improved, especially in a case of concurrent write by multiple threads.

Table 1 below shows a result of an experiment that is based on 10 million records and in which a throughput varies with a quantity of subranges partitioned from a continuous range on a single cluster node.

TABLE 1

| | Range:sub-range | Throughput (ops/sec) | Average delay (ms) |
|---|---|---|---|
| Prior art | 1:1 | 34337 | 5.6844 |
| Embodiment of the present invention | 1:8 | 43507 | 4.5916 |
| | 1:32 | 47020 | 4.2674 |

It can be seen from Table 1 that by partitioning a continuous range into at least two subranges on a cluster node, and establishing and maintaining a log queue for each subrange, for the whole distributed storage system, not only a throughput can be effectively improved, but also average delay time can be effectively reduced, which obviously contributes greatly to improving user experience. In addition, load balancing may be performed on data according to the at least two subranges, so as to eliminate load unbalance between cluster nodes and reduction in processing performance of the cluster nodes that are caused by a difference in storing the data on multiple cluster nodes and generation and transfer of a hotspot of the data.

Figure 19:
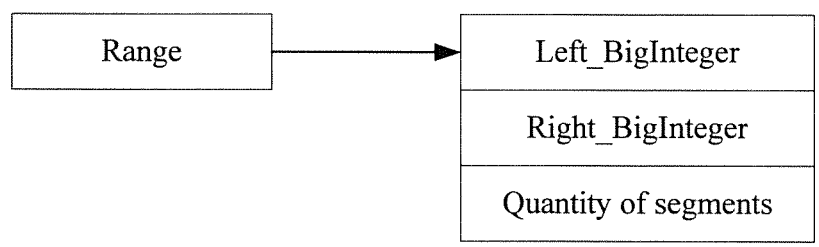
FIG. 19 shows a schematic diagram of a data structure of a range in a table entry of a routing table on a cluster node in a range management method according to another embodiment of the present invention.

In a possible implementation manner, a quantity of subranges partitioned from a continuous range is controlled by the manager node (may be specifically performed by the heartbeat detection module) in the distributed storage system. In this way, in a data structure of a range included in a table entry of a routing table sent by the manager node to a cluster node, a quantity of segments of the range may be added and used as a configuration parameter. A specific data structure may be that shown in FIG. 19. In other words, the quantity of segments, together with information that indicates the range, may be recorded in a routing table entry that is in a local routing table of the cluster node and is corresponding to the range.

Figure 14:
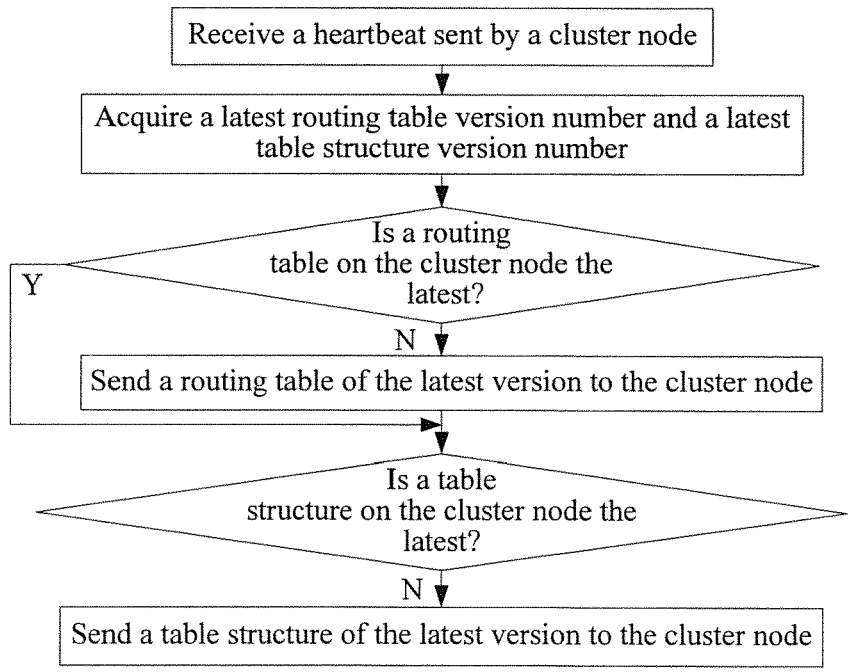
FIG. 14 shows a schematic flowchart of processing of maintaining a routing table and a table structure by a manager node in a distributed storage system.

Partitioning a continuous range into at least two subranges is performed only on a cluster node, and a routing table of the whole distributed storage system is not changed, so that an update of a routing table on the cluster node includes an update of a local routing table (which may also be regarded as an update of a routing table in a routing table management module of the cluster node) and an update of a subrange (which may also be regarded as a subrange update for synchronization in a data synchronization management module of the cluster node). The update of the local routing table may use an overwrite-all manner, that is, using a routing table of the latest version that is pushed, as shown in FIG. 14, by the manager node (may be specifically performed by the heartbeat detection module) to replace the local routing table. However, the update of the subrange needs to be performed with reference to the routing table of the latest version and a configuration parameter related to range partitioning, and a specific processing flow may be that shown in FIG. 20.

Figure 20:
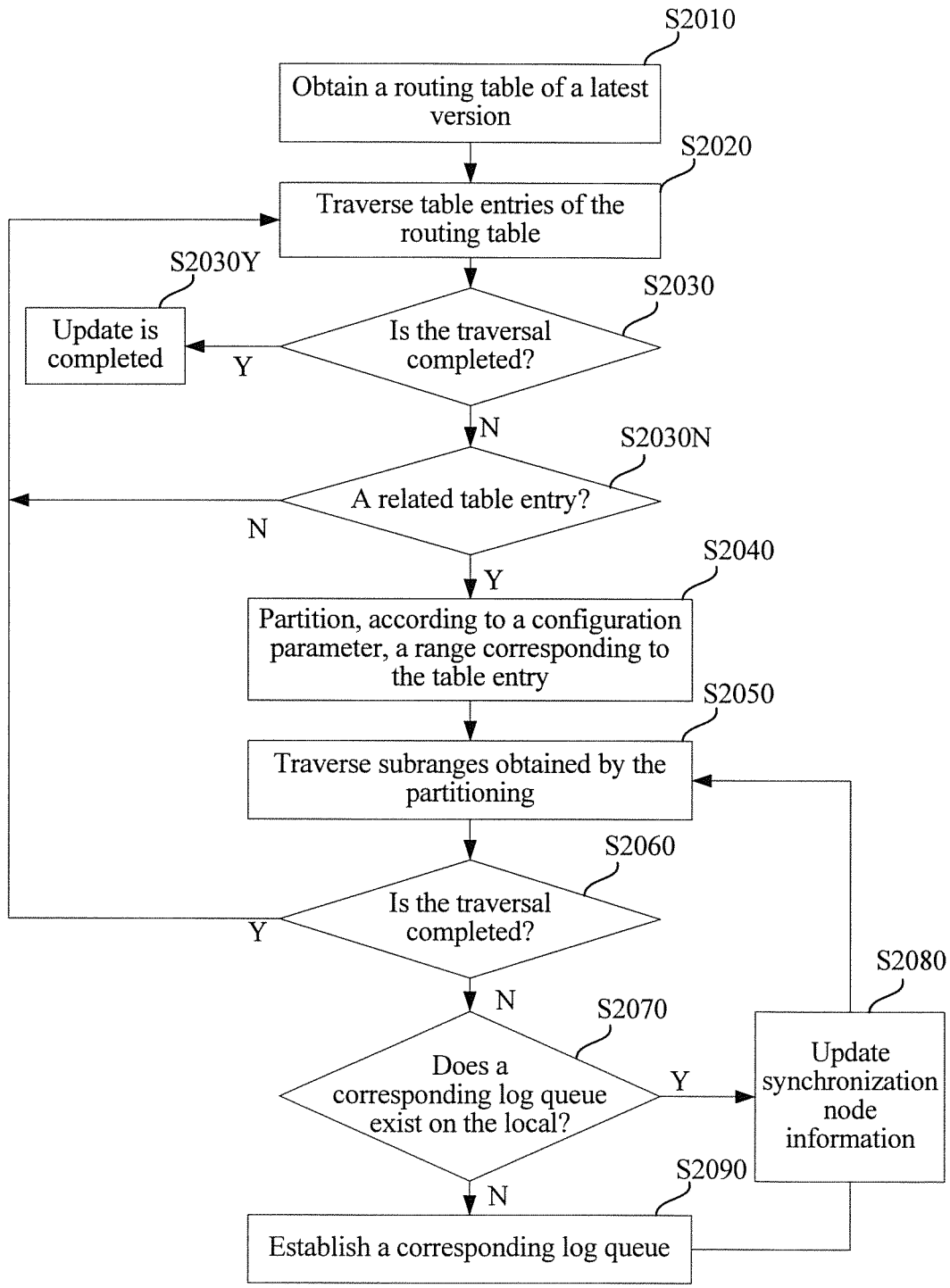
FIG. 20 shows a schematic diagram of a processing flow of subrange updating in a range management method according to still another embodiment of the present invention.

As shown in FIG. 20, the update of the local routing table triggers the update (S2010) of the subrange, and only in a case in which traversal of all table entries in the routing table of the latest version is completed, it is considered that a subrange update of the routing table of the latest version is completed (S2020, S2030, and S2030Y). For each table entry in the routing table, it needs to first determine whether the table entry is a related table entry of the cluster node, that is, whether information that indicates the cluster node is recorded in replica information of the table entry (S2030N); if a determining result is that the information that indicates the cluster node is not recorded in the replica information of the table entry, a next table entry is processed by returning to step S2020; if a determining result is that the information that indicates the cluster node is recorded in the replica information of the table entry, the range needs to be first partitioned according to a configuration parameter (S2040), and then, only in a case in which traversal of all subranges obtained by the partitioning is completed, it is considered that a subrange update of the table entry is completed (S2050 and S2060). In addition, for each subrange obtained by the partitioning, specific update steps may include: first determining whether a log queue corresponding to the subrange exists on the cluster node (S2070); and in a case in which it is determined that the log queue corresponding to the subrange already exists on the cluster node, it is considered that the update of the local routing table may mainly be an update of replica information, and therefore only updating, according to replica information in the table entry of the local routing table, synchronization node information corresponding to the subrange (S2080) is needed, where the synchronization node information indicates information about another cluster node that keeps data synchronized with that of the cluster node in the subrange; however, in a case in which it is determined that the log queue corresponding to the subrange does not exist on the cluster node, it is considered that the subrange is a newly generated subrange, and a log queue corresponding to the subrange is established (S2090).

It can be learned from the foregoing description that, an update of a subrange is triggered each time when the local routing table is updated. However, in order to ensure data consistency between master and slave cluster nodes, a corresponding log queue on the master node should not be deleted until submission on the slave node is completed, especially in a case in which data synchronization between the master node and the slave node is performed in the asynchronous submission manner. Therefore, after a subrange update responding to the update of the local routing table is completed, coexistence of a new subrange and a log queue of the new subrange and an old subrange and a log queue of the old subrange may occur on the cluster node, and the old subrange and the log queue of the old subrange can be deleted only after all submission on the slave node is completed. In addition, generally, the cluster node periodically clears a record in a log queue on the cluster node. For example, a timer may be started by a routing table management module to periodically instruct a data synchronization management module to clear the record in the log queue, thereby preventing maintaining of the log queue from occupying excessive memory. In this way, the cluster node may perform cleanup (may be specifically performed by the data synchronization management module) on the subrange according to that shown in FIG. 21.

Figure 21:
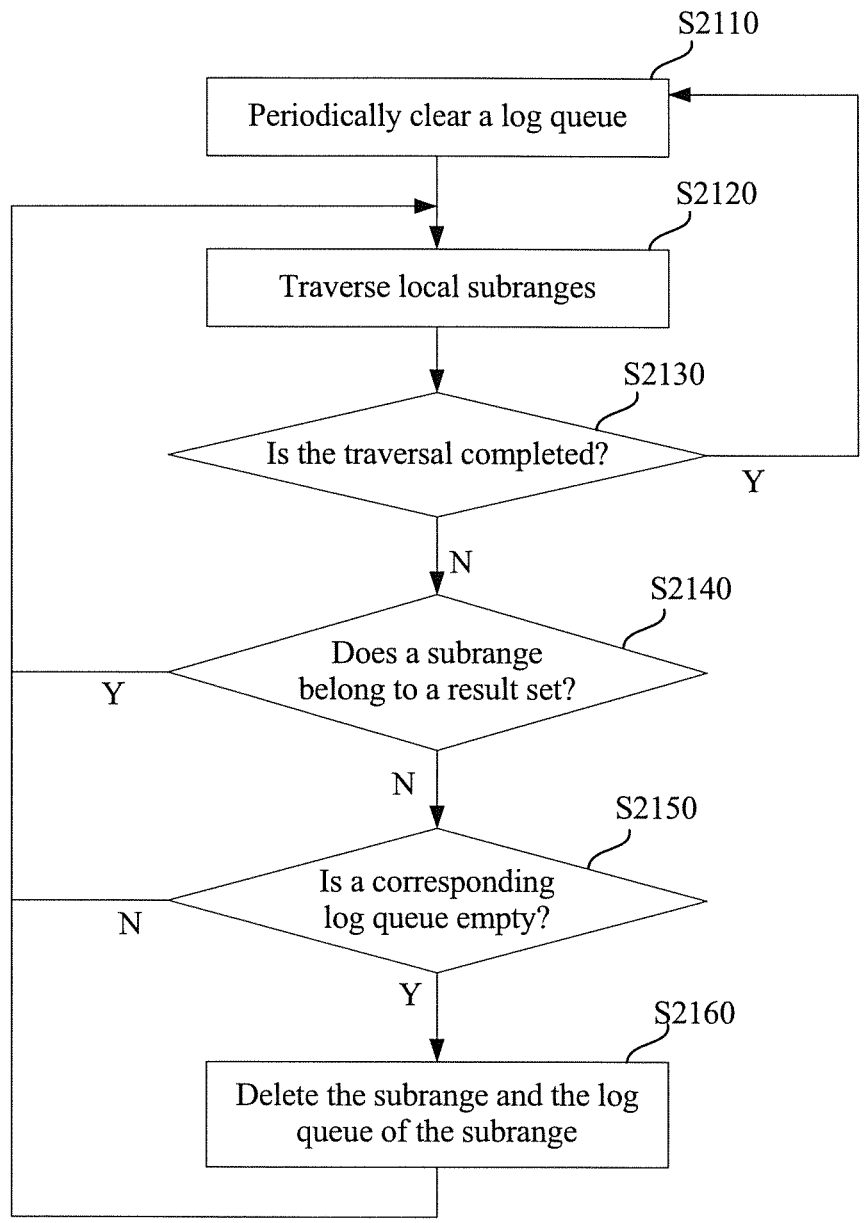
FIG. 21 shows a schematic diagram of a processing flow of subrange cleanup in a range management method according to still another embodiment of the present invention.

As shown in FIG. 21, clearance of the log queue that is periodically performed triggers cleanup of a subrange (S2110), and only in a case in which traversal of all local subranges of the cluster node is completed, it is considered that the cleanup of the subrange is completed (S2120 and S2130), and then, it waits for next log queue clearance at regular time. For each local subrange of the cluster node, a specific cleanup operation may include: it is first determined whether the subrange belongs to a result set (S2140), where the result set is a set of subranges obtained by partitioning, according to a configuration parameter, a range corresponding to a related table entry in a current local routing table, where the related table entry refers to a routing table entry that is in replica information and records information indicating the cluster node; if it is determined that the subrange does not belong to the result set, it may be considered that the subrange is an old subrange, and therefore it is further determined whether a log queue corresponding to the subrange is empty (S2150); if it is determined that the log queue corresponding to the subrange is not empty, it is considered that data synchronization between a master node and a slave node performed according to the subrange may not be completed yet, especially in the asynchronous submission manner, and therefore, the subrange should not be deleted temporally; however, if the subrange does not belong to the result set and the corresponding log queue is empty, it is considered that the subrange is an abandoned old subrange, and therefore, the subrange and the log queue of the subrange need to be deleted (S2160), so as to release memory occupied by the subrange and the log queue, and then, a next subrange is processed by returning to step S2120.

It should be noted that, although FIG. 21 shows that whether the subrange belongs to the result set is determined before whether the corresponding log queue is empty is determined, a person skilled in the art should understand that an execution order of the two determining operations is not limited to this, as long as a subrange that does not belong to the result set and of which a corresponding log queue is empty can be obtained by screening. For example, whether the corresponding log queue is empty may be first determined before whether the subrange belongs to the result set is determined, or the two determining operations may be performed simultaneously.

As described above with reference to FIG. 15, adding of a new node into a cluster triggers an update of a routing table. As a result, in a case in which a cluster node partitions a range into at least two subranges, the adding of the new node into the cluster further triggers an update of a subrange, and a specific processing flow may be that shown in FIG. 22.

Figure 22:
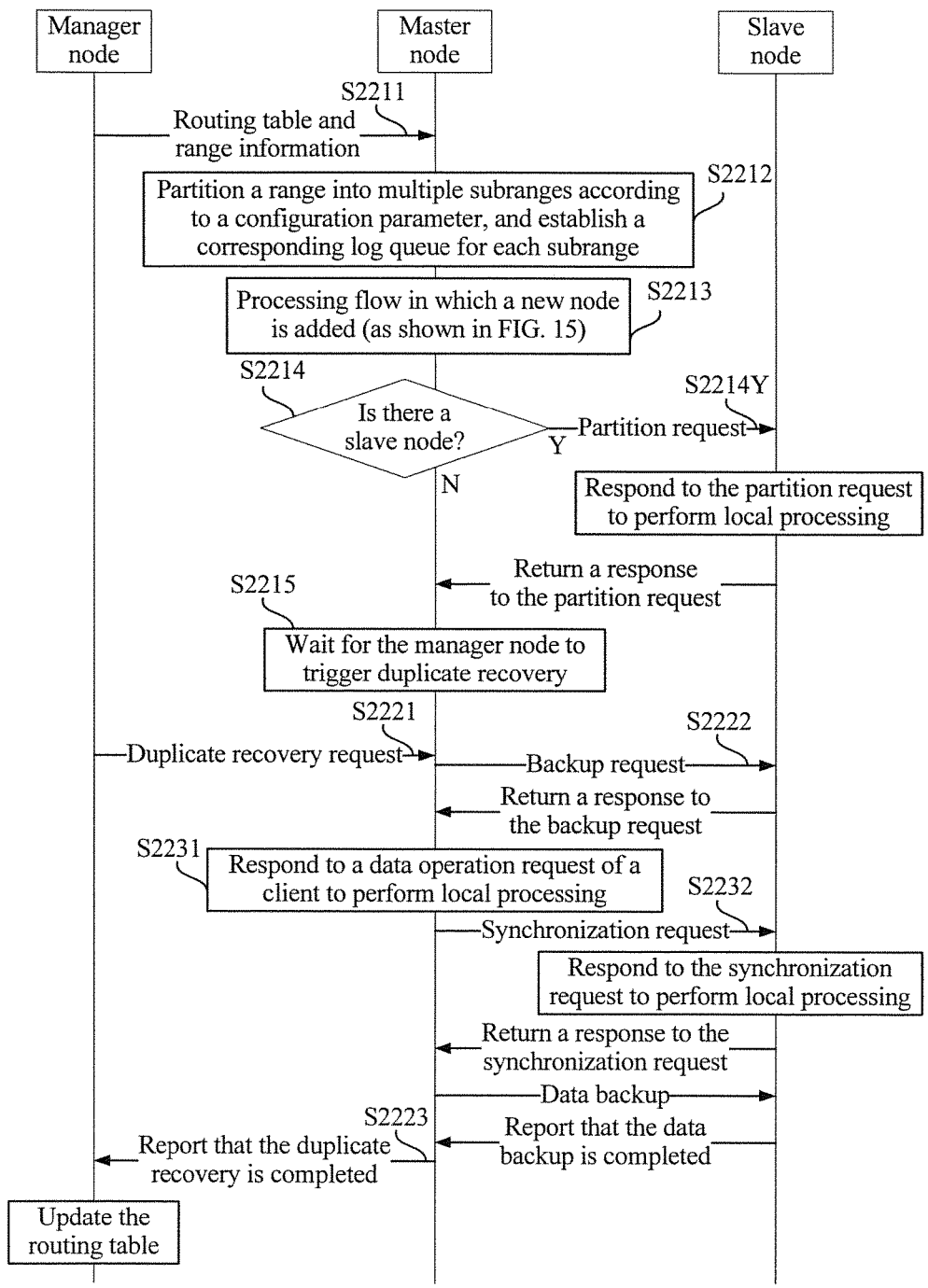
FIG. 22 shows a schematic diagram of a processing flow when a new node is added in a range management method according to still another embodiment of the present invention.

As shown in FIG. 22, the new node added into the cluster is first used as a master node to acquire, from the manager node, a routing table and information about a range that is in the charge of the new node (S2211), and then, the new node partitions (may be specifically performed by a routing table management module) the range according to a preset configuration parameter (for example, a quantity of segments that is included in range information in a routing table entry), and separately establishes (may be specifically performed by a data synchronization management module) a corresponding log queue for each subrange obtained by the partitioning (S2212). In other words, partition of a range on a master node into subranges may occur when the new node is added into the cluster as the master node.

In a possible implementation manner, the adding of the new node into the cluster may further trigger range partitioning on a slave node. Specifically, as shown in FIG. 22, after being added into the cluster as the master node (S2213), the new node determines (may be specifically performed by the routing table management module), according to replica information in a routing table entry, whether the slave node exists (S2214), and in a case in which it is determined that the slave node exists, sends a partition request to the slave node (S2214Y), where the partition request includes the configuration parameter and information that indicates the range, so that the slave node can respond to the partition request to partition the range according to the configuration parameter, and separately establish a corresponding log queue for each subrange obtained by the partitioning, so that the master node and the slave node can keep consistent in partitioning the range. However, in a case in which it is determined that the slave node does not exist, the new node directly enters a state of waiting for the manager node to trigger duplicate recovery (S2215).

In a possible specific implementation manner, the manager node may trigger a new node to perform duplicate recovery in a manner of periodically sending a duplicate recovery request (S2221), as shown in FIG. 22. Responding to the duplicate recovery request, the new node usually sends (may be specifically performed by a routing table management module) a backup request to a slave node (S2222), so that the new node can implement data consistency with the slave node before being added; and responding to a data backup completion report from the slave node, report to the manager node that duplicate recovery is completed (S2223).

In a possible specific implementation manner, as shown in FIG. 22, in the foregoing process of performing duplicate recovery, the new node may receive a data operation request from the client, perform a data operation according to the data operation request, and generate a new log record (S2231). In this case, the new node needs to send (may be specifically performed by the data synchronization management module) a synchronization request to the slave node (S2232), where the synchronization request includes information that indicates a subrange and corresponding operation data, so that the new node can implement data consistency with the slave node after being added.

Figure 23:
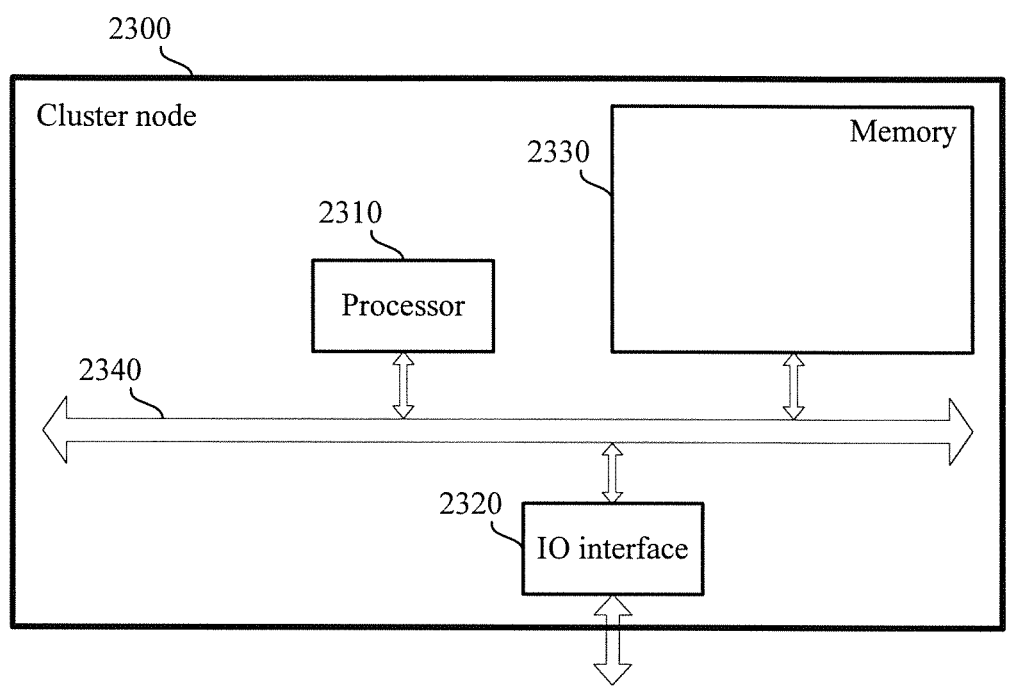
FIG. 23 shows a structural block diagram of a cluster node device according to still another embodiment of the present invention.

FIG. 23 shows a structural block diagram of a cluster node device according to another embodiment of the present invention. The cluster node device 2300 may be a host server, a personal computer PC, a portable computer or terminal, or the like that have a computing capability. A specific embodiment of the present invention sets no limitation on specific implementation of a computing node.

The cluster node device 2300 includes a processor (processor) 2310, a communications interface (Communications Interface) 2320, a memory (memory array) 2330, and a bus 2340. The processor 2310, the communications interface 2320, and the memory 2330 complete mutual communication by using the bus 2340.

The communications interface 2320 is configured to communicate with a network element, where the network element includes, for example, a virtual machine management center and a shared memory.

The processor 2310 is configured to execute a program. The processor 2310 may be a central processing unit CPU, or an application specific integrated circuit ASIC (Application Specific Integrated Circuit), or one or more integrated circuits configured to implement this embodiment of the present invention.

The memory 2330 is configured to store a file. The memory 2330 may include a high-speed RAM memory, and may further include a non-volatile memory (non-volatile memory), for example, at least one disk memory. The memory 2330 may also be a memory array. The memory 2330 may also be partitioned, and the partitions may foil ii a virtual volume according to a specific rule.

In a possible implementation manner, the foregoing program may be program code that includes a computer operation instruction. The program may be specifically used for a cluster node in a distributed storage system that includes the cluster node and a client, so that the cluster node: partitions, according to a configuration parameter, a range corresponding to a first routing table entry in a local routing table into at least two subranges, where the local routing table includes at least one routing table entry, each routing table entry includes at least range information and replica information, the range information indicates information about a range corresponding to the routing table entry, the replica information is used to record information about a cluster node set corresponding to the range, and the first routing table entry refers to a routing table entry that is in the replica information and records information indicating the cluster node; separately establishes a log queue for each of the subranges; determines a corresponding subrange according to a key field of a data operation request when the data operation request is received from the client; and executes, according to the determined subrange, a data read/write operation corresponding to the data operation request, and updates, according to the data read/write operation, a log queue corresponding to the determined subrange.

For the foregoing program, in a possible implementation manner, in a case in which the cluster node updates the local routing table, the cluster node is further made to: partition, according to the configuration parameter, a range corresponding to a first routing table entry in an updated local routing table; and for each subrange obtained by the partitioning after the updating, determine whether a log queue corresponding to the subrange exists on the cluster node; and if the log queue corresponding to the subrange exists on the cluster node, update, according to replica information in the first routing table entry, synchronization node information corresponding to the subrange, where the synchronization node information indicates information about another cluster node that keeps data synchronized with that of the cluster node in the subrange; if the log queue corresponding to the subrange does not exist on the cluster node, establish a log queue for the subrange.

For the foregoing program, in a possible implementation manner, the cluster node is further made to: for each subrange of which a corresponding log queue exists on the cluster node, determine whether the subrange is a result set and whether the log queue corresponding to the subrange is empty; and in a case in which the subrange does not belong to the result set and the log queue corresponding to the subrange is empty, delete the subrange and the log queue corresponding to the subrange from the cluster node, where the result set refers to a set of subranges obtained by partitioning, according to the configuration parameter, a range corresponding to a first routing table entry in a current local routing table of the cluster node.

For the foregoing program, in a possible implementation manner, after the cluster node is made to partition, according to the configuration parameter, the range corresponding to the first routing table entry in the local routing table into the at least two subranges, the cluster node is further made to send a partition request to another cluster node recorded in the replica information of the first routing table entry, where the partition request includes the configuration parameter and information that indicates the range, so that the another cluster node also partitions the range according to the configuration parameter.

For the foregoing program, in a possible implementation manner, making the cluster node determine the corresponding subrange according to the key field of the data operation request includes: making the cluster node perform hashing on the key field of the data operation request according to a hash algorithm; making the cluster node search for a corresponding subrange according to a result of the hashing; and in a case in which the corresponding subrange is not found, making the cluster code return, to the client, a response that indicates a routing error.

For the foregoing program, in a possible implementation manner, after the cluster node is made to separately establish a log queue for each of the subranges, the cluster node is further made to separately configure read/write operation permission for each of the subranges.

For the foregoing program, in a possible implementation manner, making the cluster node execute a corresponding data read/write operation according to the determined subrange and update a log queue corresponding to the determined subrange includes: making the cluster node obtain read/write operation permission on the determined subrange; making the cluster node write, by using a new serial number, operation data of the data operation request into the log queue corresponding to the determined subrange; and making the cluster node write the operation data into a memory and feed back a processing result to the client.

For the foregoing program, in a possible implementation manner, before the cluster node is made to write the operation data into the memory, the cluster node is further made to send a synchronization request to the another cluster node recorded in the replica information of the first routing table entry, where the another cluster node refers to a node that is in the distributed storage system and is configured to back up data of the cluster node in the range, and the synchronization request includes the operation data and information about the subrange, so that the another cluster node keeps, according to the subrange, data synchronized with that of the cluster node.

For the foregoing program, in a possible implementation manner, the configuration parameter is a quantity of segments, and the quantity of segments indicates a quantity of subranges to be partitioned from a range corresponding to the first routing table entry. In a possible specific implementation manner, both the quantity of segments and the information that indicates the range are recorded in a routing table entry that is corresponding to the range and is in the local routing table.

A person of ordinary skill in the art may be aware that, exemplary units and algorithm steps in the embodiments described in this specification may be implemented by electronic hardware or a combination of computer software and electronic hardware. Whether the functions are implemented by hardware or software depends on particular applications and design constraint conditions of the technical solutions. A person skilled in the art may select different methods to implement the described functions for a particular application, but it should not be considered that the implementation goes beyond the scope of the present invention.

If the functions are implemented in a form of computer software and sold or used as an independent product, it can be deemed to some extent that all or some of the technical solutions of the present invention (for example, the part contributing to the prior art) are implemented in a form of a computer software product. The computer software product is generally stored in a computer readable storage medium and includes several instructions for instructing a computer device (which may be a personal computer, a server, or a network device, and the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention.

What is claimed is:

1. A range management method for use in a distributed storage system having a cluster node and a client, the method comprising:
    partitioning, by the cluster node according to a configuration parameter, a range corresponding to a first routing table entry in a local routing table into at least two subranges, wherein the local routing table comprises at least one routing table entry, and each routing table entry comprises at least range information and replica information, the range information indicates information about a range corresponding to the routing table entry, the replica information is used to record information about a cluster node set corresponding to the range, and the first routing table entry refers to a routing table entry that is in the replica information and records information indicating the cluster node;
    separately establishing, by the cluster node, a log queue for each of the subranges;
    determining, by the cluster node, a corresponding subrange according to a key field of a data operation request when the data operation request is received from the client;
    executing, by the cluster node according to the determined subrange, a data read/write operation corresponding to the data operation request, and updating, according to the data read/write operation, a log queue corresponding to the determined subrange; and
    updating, by the cluster node, the local routing table, including:
        partitioning, by the cluster node according to the configuration parameter, a range corresponding to a first routing table entry in an updated local routing table;
        for each subrange obtained by the partitioning after the updating, determining, by the cluster node, whether a log queue corresponding to the subrange exists on the cluster node; and
        when the log queue corresponding to the subrange exists on the cluster node, updating, by the cluster node according to replica information in the first routing table entry, synchronization node information corresponding to the subrange, wherein the synchronization node information indicates information about another cluster node that keeps data synchronized with that of the cluster node in the subrange, or
        when the log queue corresponding to the subrange does not exist on the cluster node, establishing, by the cluster node, a log queue for the subrange.

2. The range management method according to claim 1, further comprising:
    for each subrange of which a corresponding log queue exists on the cluster node, determining, by the cluster node, whether the subrange belongs to a result set and whether the log queue corresponding to the subrange is empty; and when the subrange does not belong to the result set and the log queue corresponding to the subrange is empty, deleting the subrange and the log queue corresponding to the subrange from the cluster node, wherein the result set refers to a set of subranges obtained by partitioning, according to the configuration parameter, a range corresponding to a first routing table entry in a current local routing table of the cluster node.

3. The range management method according to claim 2, wherein after partitioning, by the cluster node according to a configuration parameter, a range corresponding to a first routing table entry in a local routing table into at least two subranges, the method further comprises:

sending, by the cluster node, a partition request to another cluster node recorded in the replica information of the first routing table entry; wherein the partition request comprises the configuration parameter and information that indicates the range, so that the another cluster node also partitions the range according to the configuration parameter.

4. The range management method according to claim 1, wherein determining, by the cluster node, a corresponding subrange according to a key field of a data operation request comprises:

performing, by the cluster node, hashing on the key field of the data operation request according to a hash algorithm;

searching for, by the cluster node, a corresponding subrange according to a result of the hashing; and when the corresponding subrange is not found, returning, by the cluster code to the client, a response that indicates a routing error.

5. The range management method according to claim 1, wherein after separately establishing, by the cluster node, a log queue for each of the subranges, the method further comprises:

separately configuring, by the cluster node, read/write operation permission for each of the subranges.

6. The range management method according to claim 5, wherein executing, by the cluster node according to the determined subrange, a data read/write operation corresponding to the data operation request, and updating, according to the data read/write operation, a log queue corresponding to the determined subrange comprises:

obtaining, by the cluster node, read/write operation permission on the determined subrange;

writing, by the cluster node by using a new serial number, operation data of the data operation request into the log queue corresponding to the determined subrange; and writing, by the cluster node, the operation data into a memory, and feeding back a processing result to the client.

7. The range management method according to claim 6, wherein before writing, by the cluster node, the operation data into a memory, the method further comprises:

sending, by the cluster node, a synchronization request to the another cluster node recorded in the replica information of the first routing table entry; wherein the another cluster node refers to a node that is in the distributed storage system and is configured to back up data of the cluster node in the range; and wherein the synchronization request comprises the operation data and information about the subrange, so that the another cluster node keeps, according to the subrange, data synchronized with that of the cluster node.

8. The range management method according to claim 1, wherein the configuration parameter is a quantity of segments, and the quantity of segments indicates a quantity of subranges to be partitioned from a range corresponding to the first routing table entry.

9. The range management method according to claim 7, wherein both the quantity of segments and the information that indicates the range are recorded in a routing table entry that is corresponding to the range and is in the local routing table.

10. A cluster node for use in a distributed storage system having the cluster node and a client, the cluster node comprising:

a memory configured to store instructions; and a processor coupled to the memory and configured to execute the instructions to:

receive a data operation request from the client, manage a local routing table of the cluster node, process the data operation request, and partition, according to a configuration parameter, a range corresponding to a first routing table entry in the local routing table into at least two subranges, wherein the local routing table comprises at least one routing table entry, and each routing table entry comprises at least range information and replica information; the range information indicates information about a range corresponding to the routing table entry, and the replica information is used to record information about a cluster node set corresponding to the range; the first routing table entry refers to a routing table entry that is in the replica information and records information indicating the cluster node, separately establish a log queue for each of the subranges, perform data storage and persistence, determine a corresponding subrange according to a key field of the data operation request, execute, according to the determined subrange, a data read/write operation corresponding to the data operation request, and update, according to the data read/write operation, a log queue corresponding to the determined subrange, and update the local routing table, including:

partition, according to the configuration parameter, a range corresponding to a first routing table entry in an updated local routing table;

for each subrange obtained by the partitioning after the updating, determine whether a log queue corresponding to the subrange exists on the cluster node; and when the log queue corresponding to the subrange exists on the cluster node, update, according to replica information in the first routing table entry, synchronization node information corresponding to the subrange, wherein the synchronization node information indicates information about another cluster node that keeps data synchronized with that of the cluster node in the subrange, or when the log queue corresponding to the subrange does not exist on the cluster node, establish, by the cluster node, a loci queue for the subrange.

11. The cluster node according to claim 10, wherein the processor is further configured to:

receive a routing table of a latest version of the distributed storage system;

update the local routing table into the routing table of the latest version;

determine whether the log queue corresponding to the subrange exists on the cluster node for each subrange obtained by the partitioning after the updating the local routing table into the routing table of the latest version.

12. The cluster node according to claim 11, wherein the processor is further configured to:

determine whether the subrange belongs to a result set and whether the log queue corresponding to the subrange is empty for each subrange of which a corresponding log queue exists on the cluster node; and delete the subrange and the log queue corresponding to the subrange from the cluster node when the subrange does not belong to the result set and the log queue corresponding to the subrange is empty; wherein the result set refers to a set of subranges obtained by partitioning, according to the configuration parameter, a range corresponding to a first routing table entry in a current local routing table of the cluster node.

13. The cluster node according to claim 12, wherein the processor is further configured to:

generate a partition request after the range corresponding to the first routing table entry in the local routing table is partitioned into at least two subranges, wherein the partition request comprises the configuration parameter and information that indicates the range; and send the partition request to another cluster node recorded in the replica information of the first routing table entry, so that the another cluster node also partitions the range according to the configuration parameter.

14. The cluster node according to claim 10, wherein the processor further is configured to:

separately configure read/write operation permission for each of the subranges.

15. The cluster node according to claim 10, wherein the configuration parameter comprises a quantity of segments, and the quantity of segments indicates a quantity of subranges to be partitioned from a range corresponding to the first routing table entry.

16. The cluster node according to claim 15, wherein both the quantity of segments and the information that indicates the range are recorded in a routing table entry that is corresponding to the range and is in the local routing table.

* * * * *